United States Patent [19]

Matsumoto et al.

[11] Patent Number: 5,049,638

[45] Date of Patent: Sep. 17, 1991

[54] PREPOLYMER COMPOSITION UTILIZING POLYOL COMBINATION FOR PRODUCTION OF COATINGS AND FILMS

[75] Inventors: Yukio Matsumoto; Nobuaki Kunii, both of Yokohama, Japan

[73] Assignee: Asahi Glass Company, Ltd., Tokyo, Japan

[21] Appl. No.: 372,890

[22] Filed: Jun. 29, 1989

Related U.S. Application Data

[62] Division of Ser. No. 229,727, Aug. 2, 1988, Pat. No. 4,945,149.

[30] Foreign Application Priority Data

Sep. 6, 1985 [JP] Japan ................................. 60-196085

[51] Int. Cl.$^5$ ............................................. C08G 18/48
[52] U.S. Cl. ........................................ 528/61; 528/63; 528/64; 528/65; 528/66; 528/76; 528/77; 528/79; 528/80; 528/85; 521/914
[58] Field of Search .................... 521/914; 528/61, 63, 528/64, 65, 66, 76, 77, 79, 80, 85

[56] References Cited

U.S. PATENT DOCUMENTS

| | | | |
|---|---|---|---|
| 3,436,361 | 4/1969 | Wooster | 528/60 |
| 3,607,837 | 9/1971 | Reegen et al. | 528/61 |
| 3,939,105 | 2/1976 | Jones, Jr. et al. | 528/61 |
| 4,125,522 | 11/1978 | Becker | 528/61 |
| 4,137,200 | 1/1979 | Wood et al. | 521/159 |
| 4,261,852 | 4/1981 | Carroll et al. | 521/914 |
| 4,367,327 | 1/1983 | Holker et al. | 528/61 |
| 4,520,042 | 5/1985 | Smith | 521/128 |

FOREIGN PATENT DOCUMENTS

| | | |
|---|---|---|
| 673678 | 11/1963 | Canada . |
| 0052915 | 5/1982 | European Pat. Off. . |
| 0096231 | 6/1983 | European Pat. Off. . |
| 0132057 | 1/1985 | European Pat. Off. . |
| 4847 | 11/1971 | Japan . |
| 4746 | 1/1974 | Japan . |
| 9424 | 3/1980 | Japan . |
| 819 | 6/1981 | Japan . |
| 207916 | 11/1984 | Japan . |
| 227922 | 12/1984 | Japan . |

Primary Examiner—John Kight, III
Assistant Examiner—Rabon Sergent
Attorney, Agent, or Firm—Oblon, Spivak, McClelland, Maier & Neustadt

[57] ABSTRACT

A coating composition for forming a substantially non-porous moisture-permeable coating layer or film of a hydrophilic polyurethane resin, which comprises a polyol combination and a polyoisocyanate compound, or a prepolymer or polyurethane resin obtained by reacting them, said polyol combination comprising:

(a) from about 50 to about 98% by weight of a polyoxyethylene polyol having an oxyethylene group content of from about 50 to about 90% by weight, a hydroxyl value of from about 15 to about 60 and at least 3 hydroxyl groups; and (b) from about 2 to about 50% by weight of a diol having a molecular weight of from about 62 to about 2,000 which may contain oxyethylene groups;

provided that the molar equivalent ratio of the component (b) to the component (a) is from about 0.2 to about 5, and the total oxyethylene group content in the components (a) and (b) is at least about 70% by weight.

5 Claims, No Drawings

PREPOLYMER COMPOSITION UTILIZING POLYOL COMBINATION FOR PRODUCTION OF COATINGS AND FILMS

This is a division of application Ser. No. 07/229,727, filed on Aug. 2, 1988, now U.S. Pat. No. 4,945,149.

The present invention relates to a coating composition for forming a moisture-permeable coating layer or film of a polyurethane resin.

It is known to produce a moisture-permeable material suitable for use e.g. as a material for clothing by forming a substantially non-porous layer of a hydrophilic polyurethane resin on a porous substrate such as cloth. This hydrophilic polyurethane resin layer functions to absorb moisture from a high humidity side and to discharge moisture to a low humidity side and thus effectively performs the moisture permeation function. As compared with a polyurethane resin layer having a numerous fine perforations formed by a conventional method such as a wet-system coagulation method, a method of dissolving fine soluble particles or a foaming method, the non-porous hydrophilic polyurethane resin layer is free from clogging of perforations and has superior water proofing properties. A porous substrate provided with such a hydrophilic polyurethane resin layer is disclosed, for instance, in Japanese Unexamined Patent Publications No. 203172/1983 and No. 222840/1983.

To form a hydrophilic polyurethane resin layer, it is common to employ a method wherein a coating composition composed of a mixture of starting materials for a hydrophilic polyurethane resin or a solution or dispersion thereof, is directly or indirectly applied to a porous substrate to form a coating layer. The indirect application means a method wherein a not-completely cured coating layer is formed on a releasable substrate, and the coating layer is then laminated on a porous substrate. In some cases, an adhesive may be employed for such lamination (see above-mentioned Japanese Unexamined Patent Publication No. 203172/1983). Otherwise, a sufficiently cured hydrophilic polyurethane resin film is firstly prepared, and this film may be laminated on a porous substrate. Such a film may be prepared usually by applying the above-mentioned coating composition to a releasable substrate and then cured. The cured film may be laminated on a porous substrate by a method wherein it is peeled off from the releasable substrate and then laminated on the porous substrate, or a method wherein it is laminated on the porous substrate while being still supported on the releasable substrate, and then the releasable substrate is removed. For the lamination, the adhesive properties or fusible properties of the hydrophilic polyurethane resin itself may be utilized, or a separate adhesive may be employed. The moisture permeability may be maintained by employing, as the adhesive, a moisture permeable adhesive (the moisture permeability may be improved particularly when the adhesive layer is made thin), or by applying the adhesive partially (for instance, in a pattern of dots or lines).

The hydrophilic polyurethane resin is usually prepared by reacting a highly hydrophilic polyol with a polyisocyanate compound, as the major starting materials. In many cases, a two-component type coating composition is employed which is a combination of an isocyanate group-containing prepolymer obtained by reacting the highly hydrophilic polyol with the polyisocyanate compound, and a curing agent for the prepolymer. As the curing agent, a polyfunctional active hydrogen compound having a low molecular weight, such as a diol or a diamine may be employed. Further, it is also possible to combine a hydroxyl group-containing prepolymer obtained by reacting a highly hydrophilic polyol with a polyisocyanate compound, and a curing agent such as a polyisocyanate compound. Furthermore, other than such combinations of the prepolymers with the curing agents, it is also possible to prepare a coating composition composed of a mixture of starting materials by a so-called one shot method without preliminarily preparing a prepolymer. If necessary, a compound obtained by blocking, with a blocking agent, isocyanate groups of the isocyanate group containing-prepolymer or of the polyisocyanate compound in the above-mentioned methods, may be mixed with other starting materials to obtain a coating composition of one-component type.

As mentioned above, the hydrophilic polyurethane resin is obtained from a highly hydrophilic polyol and a polyisocyanate compound as the major starting materials. It has been common to employ polyoxyethylene glycol as the highly hydrophilic polyol. However, the use of polyoxyethylene glycol has various problems. Firstly, when a high moisture permeability is desired, no adequate performance is obtainable by a hydrophilic polyurethane resin prepared by using such a conventional polyoxyethylene glycol. Namely, the moisture permeability of such a hydrophilic polyurethane resin is limited, and it is difficult to attain a higher moisture permeability. Secondly, at the time of curing, e.g. when the isocyanate group-containing prepolymer is cured by a curing agent, the curing rate is very slow, and it is difficult to apply and cure it at a relatively high speed, thus leading to practical and economical problems. Thirdly, the isocyanate group-containing prepolymer obtained by using polyoxyethylene glycol, is solid or liquid with very high viscosity at room temperature, and its handling is cumbersome or inconvenient. Usually, such a prepolymer is employed by dissolving it in a solvent. However, the use of a solvent is likely to bring about environmental hygienic or economical problems. Therefore, it has been desired to reduce the amount of the solvent, or to develop a coating composition substantially free from a solvent. Fourthly, the mechanical properties of the polyurethane resin obtained by using polyoxyethylene glycol are not necessarily satisfactory. With the conventional polyurethane resin, it is possible to obtain a flexible and highly stretchable coating layer or film, but the mechanical strength is poor. Thus, the conventional product is not satisfactory when a coating layer or film is required to have high mechanical strength while maintaining the flexibility and stretchability to some extent.

It is an object of the present invention to provide a coating composition for forming a coating layer or film of a hydrophilic polyurethane resin free from the above-mentioned problems.

The present invention provides a coating composition for forming a substantially non-porous moisture-permeable coating layer or film of a hydrophilic polyurethane resin, which comprises a polyol combination and a polyisocyanate compound, or a prepolymer or polyurethane resin obtained by reacting them, said polyol combination comprising:

(a) from about 50 to about 98% by weight of a polyoxyethylene polyol having an oxyethylene group content of from about 50 to about 90% by weight, a hydroxyl value of from about 15 to about 60 and at least 3 hydroxyl groups; and (b) from about 2 to about 50% by weight of a diol having a molecular weight of from about 62 to about 2,000 which may contain oxyethylene groups;

provided that the molar equivalent ratio of the component (b) to the component (a) is from about 0.2 to about 5, and the total oxyethylene group content in the components (a) and (b) is at least about 70% by weight.

Now, the present invention will be described in detail with reference to the preferred embodiments.

The coating composition of the present invention may be a so-called one shot-type composition wherein no prepolymer as mentioned above is employed, or a composition containing a polyurethane resin. However, it is preferably a composition containing a prepolymer obtained by preliminarily reacting a polyol component with a polyisocyanate compound. As mentioned above, the prepolymer includes two types. Preferably, an isocyanate group-containing prepolymer is employed. For the coating composition containing a prepolymer, it is necessary to use a curing agent to cure the prepolymer. As the curing agent for an isocyanate group-containing prepolymer, a compound having at least two functional groups containing active hydrogen, which are capable of being reacted with isocyanate groups, such as a polyol, a polyamine, a polythiol or a polycarboxylic acid, may be employed. The polyol as the curing agent may be the same compound as the polyol in the polyol mixture of the present invention. However, in the present invention, these are regarded as separate components. In the case of one-shot type, the two may not be distinguishable from one another. However, when polyols other than the polyoxyethylene polyol (a) and the diol (b) are employed, they are regarded as the curing agents. Therefore, in the case of a one-shot method, the use of a curing agent is not essential (as a part of polyols such as the diol (b) is used as a curing agent). Whereas, the curing agent for a prepolymer containing hydroxyl groups, is a compound containing at least two isocyanate groups, such as a polyisocyanate compound. This curing agent may be an isocyanate group-containing prepolymer. In such a case, the polyol mixture of the present invention is divided for the preparation of the respective prepolymers. Further, as mentioned above, the polyisocyanate compound or the isocyanate group-containing prepolymer, may be blocked with a blocking agent. The blocking agent is removed by e.g. heating, whereupon isocyanate groups are freed for reaction. Further, the polyol mixture of the present invention does not necessarily mean a polyol composition comprising both polyols (a) and (b), and the two types of polyols may be separately used for the preparation of the respective prepolymers, which are then mixed. Of course, it is common to employ both polyols (a) and (b) as a mixture. Hereinafter, the coating composition of the present invention will be described primarily with respect to a coating material comprising an isocyanate group-containing prepolymer obtained by reacting a polyol composition composed of a mixture of both polyols (a) and (b), with a stoichiometrically excess amount of polyisocyanate compound, and a curing agent for the prepolymer. However, as mentioned above, the present invention is not restricted to such a specific embodiment.

In the present invention, the polyoxyethylene polyol (a) is obtainable by adding ethylene oxide alone or together with other monoepoxides, to a tri- or higher functional initiator. The tri- or higher functional initiator is a compound containing functional groups such as hydroxyl groups, amino groups, imino groups or carboxyl groups, to which an epoxide can be added by an addition reaction, and the number of hydrogen atoms in the functional groups is at least 3. Namely, for instance, a hydroxyl group is a monofunctional group, an amino group ($-NH_2$) is a bifunctional group, and an imino group ($>NH$) is a monofunctional group. A compound having a total of such groups being at least trifunctional, preferably tri- or tetrafunctional, is used as the initiator. Preferably, a tri- or higher functional compound such as a polyhydric alcohol, a polyhydric phenol, an alkanolamine or a polyamine, is employed. Specifically, the initiator includes glycerol, trimethylolpropane, hexanetriol, pentaerythritol, diglycerol, dextrose, sucrose, diethanolamine, triethanolamine, ethylenediamine, propylenediamine, diaminotoluene and diaminodiphenylmethane. These initiators may be used alone or in combination as a mixture of two or more. A particularly preferred initiator is a trihydric alcohol such as glycerol or trimethylolpropane.

As the monoepoxide other than ethylene oxide, an alkylene oxide having at least 3 carbon atoms such as propylene oxide or butylene oxide, is preferred. However, other epoxides may be used alone or together with the alkylene oxides. For instance, styrene oxide, epichlorohydrin or a glycidylalkyl (or aryl) ether may be employed. A particularly preferred monoepoxide other than ethylene oxide is propylene oxide. The manner for the addition of ethylene oxide and propylene oxide or the like to the initiator is not particularly limited, and they may be added in a block form or in a random form.

The polyoxyethylene polyol (a) is required to contain from about 50 to about 90% by weight of oxyethylene groups. Constituents other than oxyethylene groups comprise residues of the initiator, or such residues and residues derived from monoepoxides other than ethylene oxide. Preferably, the polyol (a) contains at least 5% by weight of the residues of monoepoxides other than ethylene oxide, preferably $C_3-C_4$ alkylene oxide residues. A polyoxyalkylene polyol wherein the oxyalkylene groups are composed solely of oxyethylene groups, usually tends to be solid and difficult to handle. Further, it is likely to cause the solidification or high viscosity of the prepolymer described hereinafter. More preferably, the polyoxyethylene polyol (a) contains at least about 8% by weight of monoepoxide residues other than the oxyethylene groups, particularly propylene oxide residues (namely, oxypropylene groups). Such a polyoxyethylene polyol having e.g. oxypropylene groups, is usually liquid at room temperature and easy to handle, and the prepolymer will have a low viscosity. Oxyethylene groups in the polyoxyethylene polyol (a) are groups which bring about hydrophilic properties to the polyurethane resin. If the content is too low, the hydrophilic properties tend to deteriorate. The lower limit of the preferred oxyethylene group content is about 60% by weight, more preferably about 70% by weight.

The hydroxyl value of the polyethylene polyol (a) is required to be from about 15 to about 60. If the hydroxyl value is higher than this range, the flexibility or the texture of the polyurethane resin tends to deteriorate, and at the same time, a hard block of the polyurethane resin having poor hydrophilic properties tends to increase correspondingly, whereby the hydrophilic properties tend to deteriorate. On the other hand, if the hydroxyl value is lower than the above range, the viscosity of the prepolymer increases, and the reaction rate of the prepolymer with the curing agent, tends to be low. Further, the hydrophilic properties of the polyoxyethylene polyol (a) tend to be poor, thus leading to a deterioration of the hydrophilic properties of the polyurethane resin. The upper limit of the preferred hydroxyl value of the polyoxyethylene polyol (a) is about 50, and the lower limit is about 20, more preferably about 25.

As the diol (b), various diols such as a dihydric alcohol, a polyoxyalkylene diol and a polyester diol, may be employed. However, as will be described later, this diol (b) should not be the one which hinders the hydrophilic properties of the polyurethane resin. Accordingly, when a diol having a relatively high molecular weight is used, the amount (weight amount) increases, and the diol must be highly hydrophilic. On the other hand, in the case of a diol having a relatively low molecular weight, the amount (weight amount) is small, and it is possible to employ a diol having relatively low hydrophilic nature. The hydrophilic properties are governed mainly by the proportion of oxyethylene groups contained in the polyoxyethylene polyol (a) and the diol (b) relative to the total weight of the polyol (a) and diol (b). The oxyethylene group content is at least about 70% by weight, preferably at least about 75% by weight. The upper limit is usually about 95% by weight. In the present invention, ethylene glycol, diethylene glycol and a polyoxyethylene glycol having a higher degree of polymerization, are regarded to have an oxyethylene group content of 100% by weight. Thus, so long as the total oxyethylene group content in the polyoxyethylene polyol (a) and the diol (b) constituting the polyol mixture of the present invention, is within the above-mentioned range, the oxyethylene group content in the diol (b) has no particular limitation, and the diol (b) may not contain oxyethylene groups at all. As shown by the molar ratio described hereinafter, a diol (b) having a relatively high molecular weight should preferably be a polyoxyethylene diol having a high content of oxyethylene groups since the amount (weight amount) increases. Contrary, a diol (b) having a relatively low molecular weight is used in a small amount (weight amount), and accordingly, it may be a polyhydric alcohol, a polyether diol or polyester diol, which contains no oxyethylene groups, such as 1,4-butanediol, neopentyl glycol, dipropylene glycol, and other low molecular weight polyoxypropylene diols, and low molecular weight polyester diols. For the same reason, when the oxyethylene group content in the polyoxyethylene polyol (a), is higher, it is possible to use a diol (b) having a less content of oxyethylene groups. As a diol (b) having a relatively high molecular weight, it is preferred to employ, in addition to polyoxyethylene glycol, a polyoxyethylene diol obtainable by adding ethylene oxide, or ethylene oxide and other monoepoxides (particularly alkylene oxides) to a various bifunctional initiator (such as a dihydric alcohol or a dihydric phenol). This polyoxyethylene diol has the same structure as the above-mentioned polyoxyethylene polyol (a) except that it is bifunctional, and may be prepared by using the same material and method except that a bifunctional initiator is employed.

The molecular weight of the diol (b) is from about 62 to about 2000. The lower limit of this molecular weight is the molecular weight of ethylene glycol i.e. a diol having the lowest molecular weight. A diol having a molecular weight exceeding about 2000, tends to have a high oxyethylene group content as mentioned above, and as a result, the viscosity of the prepolymer increases. The upper limit of the molecular weight of a preferred diol (b) is about 1500, more preferably about 1200. It is preferred that the oxyethylene group content of a diol (b) having a molecular weight of at least about 400 is at least about 30% by weight, and the oxyethylene group content of a diol having a molecular weight of at least about 800, is at least about 60% by weight, although the oxyethylene group content is not so restricted. Most preferably, a polyoxyethylene glycol having a molecular weight of at least about 800, especially at least about 300, is used.

The coating composition of the present invention is preferably the one which is capable of providing a coating layer or film having not only high moisture-permeability but also high levels of elongation and tensile strength. For this purpose, the diol (b) is preferably a diol having a relatively high molecular weight. Thus, a preferred diol (b) has a molecular weight of from about 300 to about 1500. This diol having a relatively high molecular weight is required to have a high oxyethylene group content as mentioned above. The oxyethylene group content within the above-mentioned relatively low molecular weight range, is preferably at least about 30% by weight, more preferably at least about 60% by weight. A particularly preferred oxyethylene group content of the diol having a relatively high molecular weight is from about 60 to about 100% by weight. Most preferably, a polyoxyethylene glycol wherein substantially all the oxyalkylene groups are oxyethylene groups, is employed.

Each of the polyoxyethylene polyol (a) and the diol (b) may be a combination of two or more different kinds. For instance, as the polyol (a), a mixture of a triol and tetrol, or a mixture of polyols having different molecular weights, may be employed. It is usual to employ a polyoxyethylene polyol (a) and a diol (b) which are separately prepared. However, in some cases, their mixture may be prepared and employed. For instance, a mixture comprising a polyoxyethylene polyol (a) and a diol (b) can be obtained by adding e.g. ethylene oxide to a mixture comprising a tri-functional initiator or polyether polyol (having a molecular weight lower than the desired molecular weight) and a bifunctional initiator or polyether diol (having a molecular weight lower than the desired molecular weight). When the proportion of the two are outside the proportions described hereinafter, a deficient (a) or (b) may be supplemented to such a mixture.

The polyol mixture of the present invention comprises from about 50 to about 98% by weight of the polyoxyethylene polyol (a) and from about 2 to about 50% by weight of the diol (b). As mentioned above, this weight ratio may be varied within a wide range depending upon the molecular weight of the diol (b). Accordingly, the ratio of the two is preferably primarily defined by the molar ratio. Namely, in the present invention, the molar equivalent ratio of the diol (b) to the polyoxyethylene polyol (a) is from about 0.2 to 5. A preferred molar equivalent ratio of the diol (b) is from about 0.3 to about 3, particularly preferred is from about 0.4 to about 2. Normally, it is preferred that the higher the molecular weight of the diol (b), the higher the molar equivalent ratio becomes.

As mentioned above, it is preferred that the polyol mixture is reacted with a stoichiometrically excess amount of the polyisocyanate compound to obtain an isocyanate group-containing prepolymer, which is then blended to a coating composition. The isocyanate group-containing prepolymer is prepared usually by reacting the polyol mixture and the polyisocyanate compound under heating optionally in the presence of a solvent or a catalyst for the formation of urethane. The amount of the polyisocyanate compound is preferably determined by the isocyanate group content in the resulting prepolymer, since the composition of the polyol mixture may vary to a large extent as mentioned above. The isocyanate group content in the isocyanate group-containing prepolymer is preferably from about 3 to about 15% by weight, more preferably from about 3 to about 8% by weight. In the present invention, the viscosity of the isocyanate group-containing prepolymer is substantially low as compared with a similar prepolymer prepared by using a conventional polyoxyethylene glycol. An isocyanate group-containing prepolymer obtained by using a polyoxyethylene glycol having a molecular weight of about 2000 as a typical polyoxyethylene glycol, is solid at room temperature. Whereas, the isocyanate group-containing prepolymer in the present invention, is usually liquid at room temperature, and even if it is solid, its melting point is substantially lower than the melting point of the conventional product. Preferably, the prepolymer of the present invention has a viscosity of at most about 20,000 centipoise, more preferably at most about 10,000 centipoise, as measured at 25° C. Such a low viscosity prepolymer can be made into a coating composition which can be coated without using any solvent.

Various compounds having at least two isocyanate groups may be employed as the polyisocyanate compound. For instance, there may be mentioned an aromatic polyisocyanate, an aliphatic polyisocyanate, an alicyclic polyisocyanate, and modified products thereof. Further, such compounds may be employed in combination as a mixture of two or more different types. Preferably, an aromatic polyisocyanate is used. When a non-yellowing property is required, a non-yellowing modified aromatic polyisocyanate or non-aromatic polyisocyanate may be employed. Specific yellowing aromatic polyisocyanates include tolylene diisocyanate, diphenylmethane diisocyanate, polymethylenepolyphenyl isocyanate, tolidine diisocyanate, naphthalene diisocyanate and triphenylmethane triisocyanate. Non-yellowing aromatic polyisocyanates include xylene diisocyanate and $\alpha,\alpha,\alpha',\alpha'$-tetramethylxylylene diisocyanate. Aliphatic polyisocyanates include hexamethylene diisocyanate and lysine diisocyanate. Aliphatic polyisocyanates include isophorone diisocyanate, dicyclohexylmethane diisocyanate and bis-(isocyanatomethyl)cyclohexane. Modified products include a prepolymer-type modified product obtained by modifying with a polyhydric alcohol such as trimethylolpropane, a carbodiimide-modified product, a urea-modified product, a dimer and a trimer. As the polyisocyanate compound, a bifunctional compound is substantially preferred. Particularly preferred is an aromatic diisocyanate.

For the curing of the above-mentioned isocyanate group-containing prepolymer, a curing agent is required. As mentioned above, a compound having at least two active hydrogen-containing functional groups is used as the curing agent. Particularly, a relatively low molecular weight polyol, alkanolamine or polyamine, is preferably employed. Particularly preferred curing agents are diols or diamines having a molecular weight of at most about 300, especially at most about 200. For instance, ethylene glycol, 1,4-butanediol, neopentyl glycol, 1,6-hexanediol, ethylenediamine, tetramethylenediamine, hexamethylenediamine, dichlorobenzidine and isophoronediamine are preferred. It is also possible to use water as a curing agent. However, water is not usually employed because it may cause foaming, whereby the coating layer tends to be porous. In some cases, it is possible that no curing agent is incorporated in the coating composition, and the coated prepolymer is cured by moisture in the air or by a polyamine vapour. The curing agent is used preferably in an amount of from about 0.5 to about 1.3 mols, more preferably from about 0.6 to about 1.1 mols per mol of the isocyanate group-containing prepolymer.

Various components other than the above-mentioned major materials i.e. other than the polyol mixture and the polyisocyanate compound, or the prepolymer and its curing agent, may also be incorporated to the coating composition of the present invention. As one of such optional components, a solvent may be mentioned. Particularly when a prepolymer having a high viscosity is employed, it is preferred to use a solvent. However, when the viscosity of the prepolymer is not higher than about 10,000 centipoise (at 25° C.), the coating composition may be made substantially solventless. Another optional component is a stabilizer. For instance, various stabilizers which are commonly called ultraviolet absorbers, photostabilizers or antioxidants, may be incorporated. Further, a urethane-forming catalyst such as a tertiary amine or an organic tin compound may be incorporated to facilitate the curing reaction. Furthermore, a flame retardant, a filler, a coloring agent, a plasticizer or any other optional components, may be incorporated.

The coating composition of the present invention may be applied to and cured on a porous substrate or a releasable substrate to obtain a coating layer or a film. The coating layer or the film thereby obtained should be substantially non-porous. Accordingly, a curing method for forming a porous film such as a wet coagulation method is not employed. The coating layer or film obtained by the coating composition of the present invention may be in the form of a foam having independent cells. Namely, it may be a coating layer or film in the form of a foam having no substantial gas permeability. However, the coating layer or film obtained from the coating composition of the present invention is preferably a substantially foamless coating layer or film i.e. a substantially solid coating layer or film.

Now, the present invention will be described in further detail with reference to Examples. However, it should be understood that the present invention is by no means restricted to these specific Examples.

EXAMPLE 1

Tolylene diisocyanate (a mixture of 2,4-form/2,6-form in a weight ratio of 80/20) was reacted at 90° C. for 4 hours, to a mixture comprising 770 parts (parts by weight, the same applies hereinafter) of a triol having a hydroxyl value of 48.1 obtained by adding a mixture of ethylene oxide/propylene oxide (weight ratio of 80/20) to glycerol and 20 parts of diethylene glycol, to obtain an isocyanate group-containing prepolymer having an isocyanate group content of 5.9% by weight. The viscosity of this prepolymer was 6500 cp (centipoise) as measured at 25° C. (the same applies hereinafter), and the prepolymer was liquid at room temperature.

To 200 parts of the above prepolymer, 7.25 parts of ethylene glycol [the ratio of isocyanate groups/hydroxyl groups in number (hereinafter referred to as NCO/OH) being 1.2] was added and mixed, and the mixture was coated in a thickness of 0.05 mm on the surface of a releasable paper sheet, then laminated to a 70 denier nylon teffeta, and cured in a constant temperature chamber of 100° C. for 3 hours. Then, the releasable paper was peeled off. The obtained cloth was subjected to the measurement of moisture permeability in accordance with JIS (Japanese Industrial Standard) Z-0208.

On the other hand, the same prepolymer and ethylene glycol were mixed in the same proportions, and the mixture was coated in a thickness of 0.2 mm on the surface of a releasable paper sheet, and then cured in the same manner as described above to obtain a film having a thickness of 0.2 mm. By using this film, the mechanical properties were measured in accordance with JIS K-6301.

Furthermore, the same prepolymer and ethylene glycol were mixed in the same proportions, and the time until the mixture turned into a gel at 100° C. (hereinafter referred to as the "gelation time") was measured.

The results of these tests are shown in Table 1.

EXAMPLE 2

To a mixture comprising 662 parts of the same triol having a hydroxyl value of 48.1 as used in Example 1 and 117 parts of a polyoxyethylene glycol having a molecular weight of 400, 221 parts of tolylene diisocyanate was added, and the mixture was reacted at 90° C. for 4 hours to obtain an isocyanate group-containing prepolymer having an isocyanate group content of 5.8% by weight and a viscosity of 7000 cp.

By using this prepolymer and ethylene glycol in an amount such that the ratio of NCO/OH in number would be 1.2, the moisture permeability, the mechanical properties and the gelation time were measured in the same manners as in Example 1. The results are shown in Table 1.

EXAMPLE 3

To a mixture comprising 472 parts of the same triol having a hydroxyl value of 48.1 as used in Example 1 and 314 parts of a diol having a hydroxyl value of 113 obtained by adding a mixture of ethylene oxide/propylene oxide (weight ratio of 80/20) to propylene glycol, 214 parts of tolylene diisocyanate was added, and the mixture was reacted at 90° C. for 4 hours to obtain an isocyanate group-containing prepolymer having an isocyanate group content of 5.9% by weight and a viscosity of 4900 cp.

By using this prepolymer and ethylene glycol in an amount such that the NCO/OH ratio would be 1.2, the same tests as in Example 1 were conducted. The results are shown in Table 1.

EXAMPLE 4

To a mixture comprising 732 parts of the same triol having a hydroxyl value of 48.1 as used in Example 1 and 31 parts of 1,4-butanediol, 238 parts of tolylene diisocyanate was added, and the mixture was reacted at 90° C. for 4 hours to obtain an isocyanate group-containing prepolymer having an isocyanate group content of 6.0% by weight and a viscosity of 6200 cp.

By using this prepolymer and ethylene glycol in an amount such that the NCO/OH ratio would be 1.2, the same tests as in Example 1 were conducted. The results are shown in Table 1.

EXAMPLE 5

To a mixture comprising 600 parts of a triol having a hydroxyl value of 28.1 obtained by adding a mixture of ethylene oxide/propylene oxide (weight ratio of 70/30) to trimethylolpropane and 400 parts of a polyoxyethylene glycol having a molecular weight of 1000, 230 parts of xylylene diisocyanate was added, and the mixture was reacted at 90° C. for 6 hours to obtain an isocyanate group-containing prepolymer having an isocyanate group content of 5.2% by weight and a viscosity of 9200 cp.

By using this prepolymer and ethylene glycol in an amount such that the NCO/OH ratio would be 1.2, the same tests as in Example 1 were conducted. The results are shown in Table 1.

COMPARATIVE EXAMPLE 1

To 820 parts of the same triol having a hydroxyl value of 48.1 as used in Example 1, 180 parts of tolylene diisocyanate was added, and the mixture was reacted at 90° C. for 4 hours to obtain a prepolymer having an isocyanate content of 5.9% by weight.

By using this prepolymer and ethylene glycol in the same proportions as in Example 1, the same tests as in Example 1 were conducted. The viscosity of the prepolymer and the test results are shown in Table 1.

COMPARATIVE EXAMPLE 2

793 parts of a polyoxyethylene glycol having a molecular weight of 2000 and 207 parts of tolylene diisocyanate, were reacted at 90° C. for 4 hours to obtain a prepolymer having an isocyanate group content of 6.6% by weight which was solid at room temperature.

This prepolymer was mixed at 60° C. with ethylene glycol in the same proportion as in Example 1, and the mixture was subjected to the same tests as in Example 1. The results are shown in Table 1.

COMPARATIVE EXAMPLE 3

740 parts of a triol having a hydroxyl value of 112.2 obtained by adding only ethylene oxide to trimethylolpropane, and 260 parts of tolylene diisocyanate, were reacted at 90° C. for 4 hours to obtain a prepolymer having an isocyanate group content of 6.2% by weight.

By using this prepolymer and ethylene glycol in the same proportion as in Example 1, the same tests as in Example 1 were conducted. The results are shown in Table 1.

COMPARATIVE EXAMPLE 4

To a mixture comprising 248 parts of the same triol having a hydroxyl value of 48.1 as used in Example 1 and 579 parts of a polyoxyethylene glycol having a molecular weight of 2000, 173 parts of tolylene diisocyanate was added, and the mixture was reacted at 90° C. for 5 hours to obtain an isocyanate group-containing prepolymer having an isocyanate group content of 4.8% by weight and a viscosity of 17,500 cp.

By using this prepolymer and ethylene glycol in an amount such that the NCO/OH ratio would be 1.2, the same tests as in Example 1 were conducted. The results are shown in Table 1.

TABLE 1

|  | Viscosity of prepolymer [cp] | Gelation time [min] | Moisture-permeability [g/m² · 24 hr. 0.05 mm] | Elongation (0.2 mm) [%] | Tensile strength [kg/cm²] | Tear strength [kg/cm] |
| --- | --- | --- | --- | --- | --- | --- |
| Example 1 | 6,500 | 29 | 7,200 | 100 | 32 | 25 |
| Example 2 | 7,000 | 32 | 7,000 | 206 | 52 | 26 |
| Example 3 | 4,900 | 35 | 7,800 | 316 | 66 | 28 |
| Example 4 | 6,200 | 30 | 7,200 | 143 | 45 | 26 |
| Example 5 | 9,200 | 51 | 7,900 | 350 | 64 | 29 |
| Comparative Example 1 | 6,200 | 27 | 6,200 | 43 | 15 | 19 |
| Comparative Example 2 | Solid | 135 | 5,400 | 280 | 20 | 15 |
| Comparative Example 3 | 68,000 | 23 | 3,200 | 32 | 23 | 21 |
| Comparative Example 4 | 17,500 | 104 | 5,700 | 490 | 47 | 33 |

The coating composition of the present invention makes it possible to produce a highly moisture-permeable coating layer or film, and at the same time, it has a high curing rate and thus can practically advantageously be used. Further, the prepolymer has a low viscosity, and it is possible to obtain a coating composition containing no solvent, which is advantageous not only from the viewpoint of the environment hygiene but also from the viewpoint of economy since the energy cost for the curing is minimum. Furthermore, the composition of the present invention has a feature that the balance of the elongation and other mechanical properties can be varied, and it is possible to obtain e.g. a highly strong film or a laminated cloth having an excellent texture.

We claim:

1. A prepolymer composition for forming a substantially non-porous moisture-permeable coating layer or film of a hydrophilic polyurethane resin by reaction with a curing agent, which prepolymer composition is a polyol combination with a stoichiometrically excess amount of a polyisocyanate compound, said prepolymer having a viscosity of at most 10,000 cp at 25° C., said polyol combination comprising:
   (a) from about 50 to about 98% by weight of a polyoxyethylene polyol having an oxyethylene group content of from about 50 to about 90% by weight, at least 5% by weight of $C_3$-$C_4$ alkylene oxide residues, a hydroxyl value of from about 15 to about 60 and at least 3 hydroxyl groups; and
   (b) from about 2 to about 50%s by weight of a diol having a molecular weight of from about 62 to about 2,000 which may contain oxyethylene groups;
provided that the molar equivalent ratio of the component (b) to the component (a) is from about 0.3 to about 3, and the total oxyethylene group content in the components (a) and (b) is from about 75% to about 95% by weight.

2. The composition according to claim 1, wherein the polyoxyethylene polyol (a) is an adduct obtained by adding ethylene oxide together with other monoepoxides to a tri- or higher functional initiator selected from the group consisting of a polyhydric alcohol, a polyhydric phenol, an alkanolamine, a polyamine, and a mixture thereof.

3. The composition according to claim 2, wherein the initiator is glycerol, trimethylolpropane, hexanetriol, pentaerythritol, diglycerol, dextrose, sucrose, diethanolamine, triethanolamine, ethylenediamine, propylenediamine, diaminotoluene, diaminodiphenylmethane or a mixture thereof.

4. The composition according to claim 1, wherein the diol (b) is a dihydric alcohol, a polyoxyalkylene diol, a polyester diol or a mixture thereof.

5. The composition according to claim 4, wherein the diol (b) is a polyoxyethylene diol having a molecular weight of from 300 to 1500 and an oxyethylene group content of at least 60% by weight.

* * * * *